United States Patent [19]
Bertani

[11] Patent Number: 5,383,360
[45] Date of Patent: Jan. 24, 1995

[54] COLUMN-TYPE LEVEL INDICATOR FOR TANKS AND THE LIKE, COMPRISING MEANS FOR ITS OUTWARD APPLICATION

[75] Inventor: Alberto Bertani, Milan, Italy

[73] Assignee: Elesa S.P.A., Italy

[21] Appl. No.: 136,966

[22] Filed: Oct. 14, 1993

[30] Foreign Application Priority Data

May 5, 1993 [IT] Italy .............. MI93U000372

[51] Int. Cl.6 .................................. G01F 23/02
[52] U.S. Cl. ................................. 73/323; 73/326
[58] Field of Search ............... 73/323, 326, 328; 116/227, 276; 411/49, 51, 53, 55, 915

[56] References Cited

U.S. PATENT DOCUMENTS

| | | | |
|---|---|---|---|
| 3,196,733 | 7/1965 | Cohen et al. | 411/51 |
| 3,455,163 | 7/1969 | Lukas et al. | 73/328 |
| 3,968,688 | 7/1976 | Eaton et al. | 73/328 |

FOREIGN PATENT DOCUMENTS 2561324  9/1985  France .................. 411/55

*Primary Examiner*—William A. Cuchlinski, Jr.
*Assistant Examiner*—Willie Morris Worth
*Attorney, Agent, or Firm*—Pearne, Gordon, McCoy & Granger

[57] ABSTRACT

A column-type level indicator, to be applied on the wall of tanks or containers for liquids in order to measure their level and/or temperature, of the type in which the fixing screws (4, 5), suitably provided with axial and transversal holes, also act as ducts to let said liquids into the indicator column (1). With each of said screws (4, 5) there is associated a bushings (8) of yielding material, partially housed into a seat (7) surrounding the screw (4, 5), formed in the rear wall (2) of the indicator column (1), as well as a nut (9) having an outside diameter equal to that of said bushing (8).

2 Claims, 1 Drawing Sheet

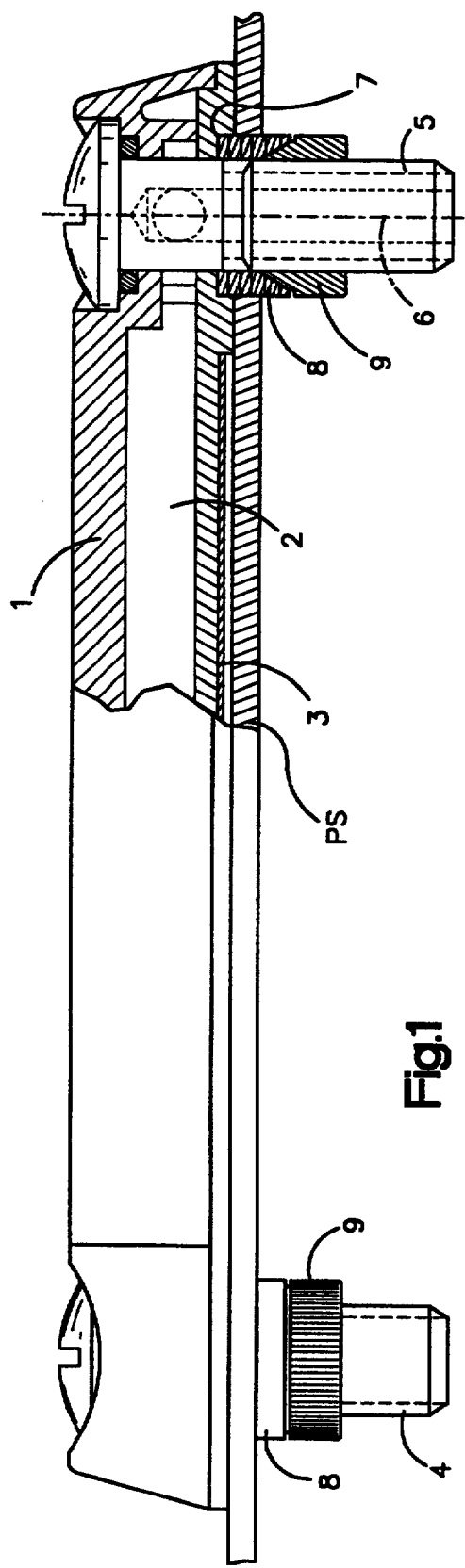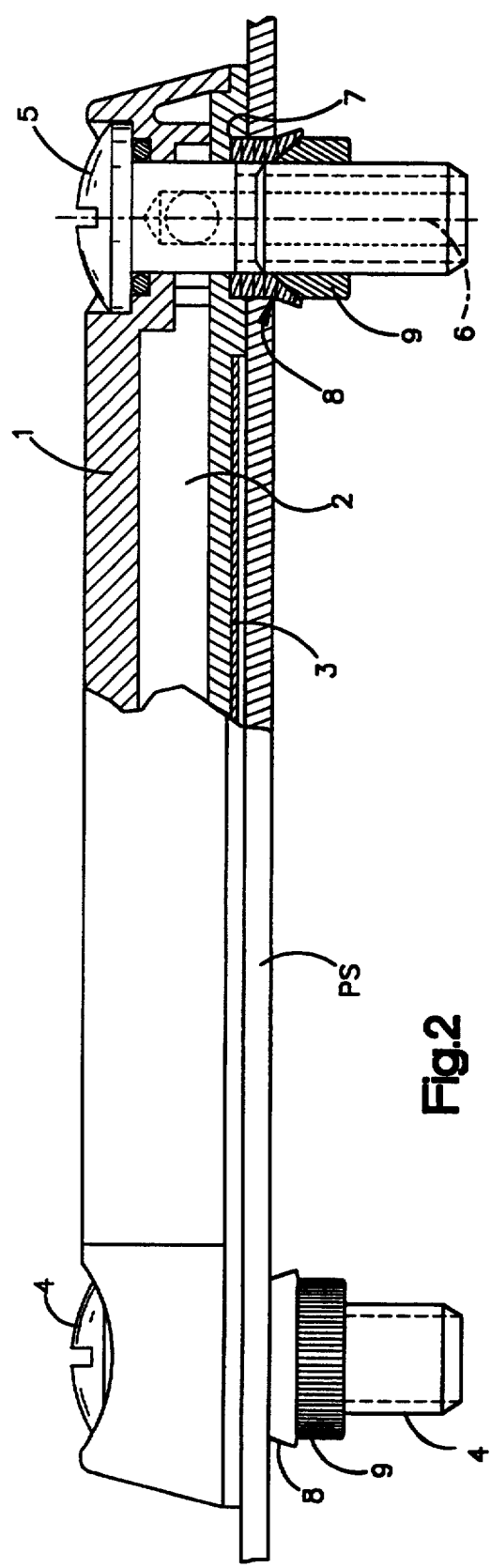

COLUMN-TYPE LEVEL INDICATOR FOR TANKS AND THE LIKE, COMPRISING MEANS FOR ITS OUTWARD APPLICATION

BACKGROUND OF THE INVENTION

The present invention concerns a column-type level indicator for tanks or containers of liquids and the like, particularly for oil tanks, provided with means for its outward application.

It is known to make use in industry of column-type indicators, to be applied on the external walls of oil tanks or other containers for liquids so as to measure their level and/or temperature. Indicators of this type consist of a hollow column—of glass or of a transparent polymeric material—fixed to the external wall of the tank and communicating with its inside. Usually, the indicator is fixed to the wall of the tank by making two holes therein for the two screws and nuts emerging from the ends of the indicator column. Said screws, provided with axial and transversal holes, allow the passage of the liquid between the tank and the cavity of said column. The oil—according to the principle of communicating vessels—flowing into the column, reaches a level equal to that of the tank. In this way, the oil level in the tank can be easily measured (possibily, with reference to a scale or to indications in the column); while furthermore, thanks to its direct contact with a thermometer possibly provided therein, one can read also its temperature.

However, the drawback of such indicators lies in the fact that, in order to be fixed to the tank, the nuts for the screws have to be applied and tightened from the inside of the tank, which often involves considerable difficulties from the practical point of view, for example in the case of narrow tanks, or tanks without an easy access.

SUMMARY OF THE INVENTION

The present invention allows to brilliantly solve this problem by providing a column-type level indicator, to be applied on the wall of tanks or containers for liquids in order to measure their level and/or temperature, of the type in which the fixing screws, suitably provided with axial and transversal holes, also act as ducts to let said liquids into the indicator column, and characterized in that, to each of said screws there is associated a bushing of yielding material—partially housed into a seat surrounding the screw, formed in the rear wall of the indicator column—as well as a nut having an outside diameter equal to that of said bush.

Said level indicator is applied to the tank, or like, by making therein two holes, corresponding to said screws and having a diameter slightly exceeding that of said bushings and nets, by inserting into said holes the screws with the bushings and nuts, and by tightening said screws from the outside.

Preferably, the bushing and the nut for said screws are mutually engaged along opposed complementary conical surfaces.

BRIEF DESCRIPTION OF THE DRAWING

The present invention is now described in further detail, with reference to the accompanying drawing, wherein FIGS. 1 and 2 are lateral, part section views of the column-type level indicator, showing two successive steps of its application.

DESCRIPTION OF THE PREFERRED EMBODIMENT

The level indicator according to the invention comprises, in known manner, a column 1 of transparent material (preferably a polyamidic-based technopolymer), having a main cavity 2 and housing, into a thin rear recess, an aluminum plate 3 which may report a graduated scale and/or indications of different type as, for example, the minimum and maximum oil levels in the tank.

Two end screws 4, 5, are provided to fix the indicator to the tank wall PS, also in known manner. Such screws comprise axial and transversal holes, so as to form a passage 6 allowing to let through the oil from the tank (of which only a small portion of the wall PS is shown) into the cavity 2 of the indicator column 1. According to the invention, in correspondence of the screws 4, 5, the rear part of the column 1 comprises two seats—only one of which, 7, is shown on the drawings—into which is partially housed a bushing 9 of yielding material (for instance, rubber). Nuts 9 are provided on the screws 4, 5, said nuts having the same outside diameter as the bushings 8 and being in contact with these latter so as to keep them into the seats 7.

FIG. 1 illustrates the level indicator according to the invention in the first step of its application to the tank wall PS. The bushings 8 and nuts 9 have complementary conical surfaces, in mutual contact, so as to favor the insertion of the nut into the bushing and the consequent deformation of this latter when the nuts are screwed even further.

To apply the column-type indicator according to the invention, it is first of all necessary to make into the tank wall PS two holes—of diameter slightly exceeding that of the two bushings 8 and of the two nuts 9—at a distance equal to that which parts the screws 4 and 5. Said screws 4 and 5 can then be inserted into said holes and, by imparting a slight pressure, the indicator column 1 can be pushed in contact with the wall PS. To fix said column, it will now be sufficient to tighten the screws 4 and 5 with a screwdriver. The screws 4 and 5 are thus driven into the respective nuts 9, which compress the bushings 8; these latter undergo an elastic deformation, opening—as shown in FIG. 2—onto said nuts, in the same way as the known screw anchors or dowels; the screws 4 and 5 are thus anchored onto the tank wall PS thanks to the engagement of said bushings with the edges of the holes made into said wall. This allows to obtain the full anchorage of the level indicator onto the tank wall and, at the same time, a perfect seal against any oil leakages, since the bushings 8 of yielding material also act as gaskets.

An arrangement of this type is evidently simple and economic, and allows to brilliantly solve the problem of the troublesome introduction and application of the nuts from the inside of the tank; at the same time it provides a very efficient anchorage and a perfect seal against any oil leakages.

I claim:

1. Column-type level indicator to be applied on a wall of a tank or container for liquids in order to measure liquid level, said level indicator comprising a transparent indicator column (1) having a cavity (2) and a rear wall, fixing screws (4, 5) having shafts passing through said cavity and rear wall of said indicator column (1) for insertion through associated holes in said tank wall, said shafts of said fixing/screws having axial and transverse holes for communicating said cavity with an interior of the tank to allow said liquids to flow into and out of the indicator column (1), a bushing (8) of yielding material associated with each of said screws (4, 5) for extending through said associated holes in said tank, said bushing partially housed in a seat (7) formed in the rear wall of the indicator column (1), a nut (9) associated with each of said screws (4, 5) and engaging said bushing (8), said nut (9) having an outside diameter generally equal to an outside diameter of said bushing (8) and having means outwardly deform said bushing upon rotation of said screw (4, 5) to fix and seal said indicator column to said tank wall.

2. Column-type level indicator as in claim 1, wherein said means to deform said bushing comprises said bushing (8) and nut (9) mutually engaged along opposed complementary conical surfaces.

* * * * *

UNITED STATES PATENT AND TRADEMARK OFFICE
CERTIFICATE OF CORRECTION

PATENT NO. : 5,383,360
DATED : January 24, 1995
INVENTOR(S) : Bertani, Alberto

It is certified that error appears in the above-identified patent and that said Letters Patent is hereby corrected as shown below:

```
Title page, item [57], Abstract, line 7, delete "bushings" and insert
--bushing--.

Column 1, line 56, delete "nets" and insert --nuts--.

Column 2, line 68, (Claim 1, line 8), delete "fixing/screws"
      and insert --fixing screws--.

Column 4, line 1, (Claim 1, line 18), after "means" insert
      --to--.
```

Signed and Sealed this

Eighteenth Day of April, 1995

Attest:

BRUCE LEHMAN

*Attesting Officer*   *Commissioner of Patents and Trademarks*